United States Patent
Priem et al.

(10) Patent No.: US 9,874,190 B2
(45) Date of Patent: Jan. 23, 2018

(54) CRANK ONLY EXERCISE MODE

(71) Applicant: Cummins Power Generation IP, Inc., Minneapolis, MN (US)

(72) Inventors: Dan G. Priem, Brooklyn Center, MN (US); Leo T. Steffl, Plymouth, MN (US)

(73) Assignee: Cummins Power Generation IP, Inc., Minneapolis, MN (US)

( * ) Notice: Subject to any disclaimer, the term of this patent is extended or adjusted under 35 U.S.C. 154(b) by 177 days.

(21) Appl. No.: 15/006,846

(22) Filed: Jan. 26, 2016

(65) Prior Publication Data

US 2017/0211535 A1 Jul. 27, 2017

(51) Int. Cl.
| F02N 11/08 | (2006.01) |
| F02N 11/04 | (2006.01) |
| F02B 63/04 | (2006.01) |
| G01M 15/04 | (2006.01) |

(52) U.S. Cl.
CPC .......... F02N 11/0811 (2013.01); F02B 63/04 (2013.01); F02N 11/04 (2013.01); G01M 15/042 (2013.01)

(58) Field of Classification Search
CPC ...... F02N 11/0811; F02N 11/04; F02N 11/06; G01M 15/042; G01M 15/00; F02B 63/04
See application file for complete search history.

(56) References Cited

U.S. PATENT DOCUMENTS

| 743,331 A | 11/1903 | Ries |
| 6,074,246 A | 6/2000 | Seefeldt et al. |
| 6,351,692 B1 | 2/2002 | Eaton et al. |
| 6,420,801 B1 | 7/2002 | Seefeldt |
| 7,230,345 B2 | 6/2007 | Winnie et al. |
| 8,369,068 B2 | 2/2013 | Jonas et al. |
| 8,483,982 B2 | 7/2013 | Hancock et al. |
| 2005/0103195 A1 | 5/2005 | Golner |
| 2006/0152198 A1* | 7/2006 | Winnie .................. F02D 29/06 322/29 |
| 2009/0096426 A1 | 4/2009 | Schaper et al. |

(Continued)

FOREIGN PATENT DOCUMENTS

| CN | 102570744 | 7/2012 |
| CN | 202535220 U | 11/2012 |

(Continued)

OTHER PUBLICATIONS

International Search Report and Written opinion for PCT Patent Application No. PCT/US2017/14765, dated Apr. 7, 2017, 10 pages.

(Continued)

*Primary Examiner* — Jacob Amick
(74) *Attorney, Agent, or Firm* — Foley & Lardner LLP

(57) ABSTRACT

Methods and systems for exercising a genset are disclosed herein. The method includes detecting whether the genset is in a first mode or a second mode, and activating a plurality of exercise cycles of the genset. Activating the plurality of exercise cycles comprises, in response to detecting the genset is in the first mode, ignite fuel to activate the genset during each of the plurality of exercise cycles of the genset; and in response to detecting the genset is in the second mode, cranking the genset without igniting fuel during at least a first subset of the plurality of exercise cycles.

27 Claims, 3 Drawing Sheets

(56) References Cited

U.S. PATENT DOCUMENTS

2010/0083669 A1 4/2010 Foster et al.
2010/0186373 A1 7/2010 Pierz et al.

FOREIGN PATENT DOCUMENTS

| CN | 203386091 U | 1/2014 |
|---|---|---|
| GB | 1 416 741 | 12/1975 |
| GB | 2 450 758 | 1/2009 |
| JP | 2008-029092 | 2/2008 |

OTHER PUBLICATIONS

U.S. Appl. No. 15/006,899, filed Jan. 26, 2016, Priem, Dan G.
U.S. Appl. No. 15/006,791, filed Jan. 26, 2016, Priem, Dan G.

* cited by examiner

CRANK ONLY EXERCISE MODE

TECHNICAL FIELD

The present application relates generally to gensets. More particularly, the present application relates to methods of exercising gensets.

BACKGROUND

Engine-driven electrical generators, or gensets may be exercised on a regular basis to ensure proper operation. Exercising a genset can help lengthen the operating lifetime of the genset.

SUMMARY

One embodiment of the invention relates to a method for exercising a genset. The method includes detecting whether the genset is in a first mode or a second mode, and activating a plurality of exercise cycles of the genset. Activating the plurality of exercise cycles comprises, in response to detecting the genset is in the first mode, igniting fuel to activate the genset during each of the plurality of exercise cycles of the genset, and in response to detecting the genset is in the second mode, cranking the genset without igniting fuel during at least a first subset of the plurality of exercise cycles.

Another embodiment relates to a system. The system includes circuitry configured to: detect whether a genset is in a first mode or a second mode. In response to detecting the genset is in the first mode, the circuitry is configured to ignite fuel to activate the genset during each of a plurality of exercise cycles of the genset. In response to detecting the genset is in the second mode, the circuitry is configured to crank the genset without igniting fuel during at least a first subset of the plurality of exercise cycles.

Still another embodiment relates to a genset. The genset includes an engine including a fuel valve and an ignition system, a starter operatively connected to the engine, an alternator operatively connected to the engine, an exciter electrically coupled to the alternator, and a controller communicably connected with the engine, the starter, the alternator, and the exciter. The controller is configured to detect whether the genset is in a first mode or a second mode. In response to detecting the genset is in the first mode, the controller is configured to ignite fuel to activate the genset during each of a plurality of exercise cycles of the genset. In response to detecting the genset is in the second mode, the controller is configured to ignite fuel to activate the genset during a first subset of the plurality of exercise cycles, and crank the genset without igniting fuel during a second subset of the plurality of exercise cycles. Cranking the engine comprises actuating the starter to accelerate the engine to a speed lower than a nominal speed of the genset, and actuating the exciter to provide a field current to the alternator. The controller is also configured to activate one or more diagnostic processes on at least one of a starter, a battery, the alternator, an oil lube system, a temperature sensor, a speed sensor, the exciter, or a voltage regulator of the genset while cranking the genset without igniting fuel, obtain diagnostic data while the diagnostic processes are active, detect a fault in the diagnostic data, and provide a notification of the fault.

These and other features, together with the organization and manner of operation thereof, will become apparent from the following detailed description when taken in conjunction with the accompanying drawings.

DETAILED DESCRIPTION

Figure 1:
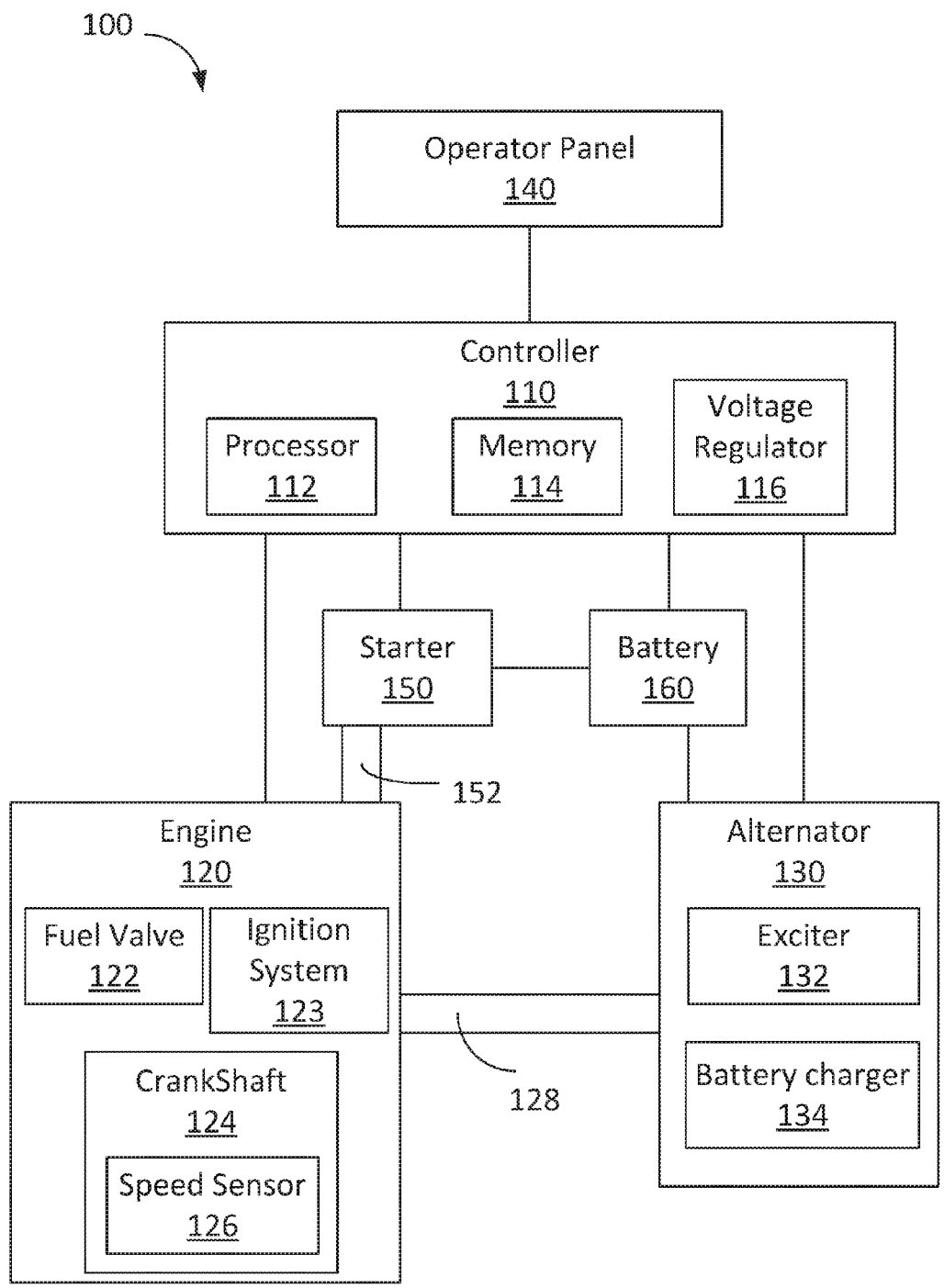
FIG. 1 is a schematic diagram of a genset with a crank only exercise mode.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

Gensets are exercised on a regular basis to insure proper operation. In order to exercise a genset, the engine is either automatically or manually started and run for a period of time (for example, from 20 minutes to a few hours) at its nominal operating speed with or without a load. This exercise routine helps solve several problems related to a genset that sits unused for periods of time, such as clearing out stale fuel, lubricating engine parts, preventing carbon buildup at electrical contacts, cleaning rotor field slip rings and promoting good contact operation, etc. The exercise routine contributes to a more reliable genset and extends the life of the genset. However, it can be appreciated that the exercise of the genset produces unpleasant noise in the neighborhood. In addition, the exercise method draws in moisture to the engine which is not burned off, potentially leading to engine corrosion or engine lubrication oil degradation. As such, an exercise method with reduced noise that avoids drawing in damaging moisture to gensets is desired.

Referring to the Figures generally, various embodiments disclosed herein relate to systems and methods of exercising a genset without providing fuel or enabling ignition to activate the genset during one or more exercise cycles. In particular, a "crank only exercise mode" is provided and, in some embodiments, may supplement an exercise routine in which the genset is provided with fuel and ignition function and operated during each exercise cycle. In the crank only exercise mode, fuel ignition does not happen (e.g., the fuel valve of the genset is shut off, and/or the ignition system of the genset is disabled, and/or the throttle is disabled, and/or the engine valve train is disabled, etc.) for at least some exercise cycles. The genset goes through a full crank cycle in, for example, 1 to 60 seconds (e.g., 5 seconds) but, because no fuel is provided and/or the ignition is disabled, ignition of the fuel will not happen. Diagnostics may be run on the battery, the alternator, the oil lube system, the temperature sensor, the speed sense circuitry, the excitation circuitry, the output voltage circuitry, etc. If any issues are detected, a user may be notified of the fault. Alternatively, a second or third crank only exercise may be run to see if the fault repeats (e.g., before notifying the user). If no issue is detected, the user may be notified of the successful exercise event. The crank only exercise can be set to be applied periodically, such as at every other scheduled exercise (e.g., weekly, biweekly, monthly, etc.). This crank only exercise provides many of the benefits of a normal genset exercise without consuming fuel and at a lower noise level. In addition, due to the brief running time and lack of thermal cycle, damaging moisture inherent from running many gaseous fuels will not be drawn to the engine, and greater engine reliability may be achieved, especially in gaseous genset applications.

Referring to FIG. 1, a schematic diagram of a genset 100 with a crank only exercise mode is shown according to an exemplary embodiment. The genset 100 includes an engine 120, a common shaft 128, an alternator 130, a controller 110, an operator panel 140, a starter 150, a motive power shaft 152, and a battery 160. In various implementations, a genset may include fewer, greater, or different components than those shown in FIG. 1.

The engine 120 may drive the alternator 130 (also called a generator) through the common shaft 128. The engine 120 may be a gas turbine engine, a gasoline engine, a diesel engine, or any other engine capable of supplying mechanical power to drive the generator 130. The engine 120 includes, among others, a fuel valve 122, an ignition system 123, and a crankshaft 124. Other engine components (e.g., a combustor, an oil lube system, etc.) are omitted in the Figure for ease of explanation. The fuel valve 122 may include a solenoid valve that can be turned on or off by the controller 110. When the fuel valve 122 is activated, fuel can be supplied to the combustor (not illustrated in the present Figure) of the engine 120. The fuel is then compressed and ignited by the ignition system 123 within the cylinder(s) so as to generate reciprocating motion of pistons of the engine 120. The reciprocating motion of the pistons is converted to rotary motion by the crankshaft 124 which, in turn, drives the alternator 130 through the common shaft 128. When the fuel valve 122 is turned off in the crank only exercise mode, no fuel is supplied. Additionally or alternatively, the ignition system 123 is disabled in the crank only exercise mode, and/or the throttle (not illustrated in the present figures) is closed, and/or the engine valve train (not illustrated in the present figures) is deactivated, so that no ignition can happen. The crankshaft 124 is driven by the starter 150 through the motive power shaft 152, which will be discussed in detail below with the description of the starter 150. The crankshaft 124 may include a speed sensor 126 structured to monitor the speed of the crankshaft 124 and generate signals indicative of the speed for the use of the controller 110 (e.g., to maintain the speed above a speed where the starter is de-energized).

During a starting sequence before fuel is supplied and ignited (i.e., engine "cranking"), the engine 120 receives motive power supplied by the starter 150 through the motive power shaft 152 and/or starter gearing. The starter 150 may include a dedicated starter motor or any other machine capable of generating motive power, such as a starter-generator. The controller 110 may generate start signals to actuate the starter 150, which causes the engine 120 to accelerate (i.e., "crank") through a set of gears.

As shown in FIG. 1, the starter 150 receives electrical power from the battery 160. In other embodiments, the starter 150 may receive power from other direct current (DC) or alternating current (AC) power sources. In some embodiments, the battery 160 includes a rechargeable battery that supplied a voltage at 12 VDC.

The alternator 130 may produce electrical power from the mechanical input supplied by the engine 120. The alternator 130 includes, among others, the exciter 132 and the battery charger 134. Other generator components (e.g., a rotor, a stator, etc.) are omitted in the Figure. The alternator 130 may include a rotor that generates a moving magnetic field around a stator, which induces a voltage difference between windings of the stator. This produces an AC output of the genset 100. The moving magnetic field may be produced by permanent magnets or by field coils. In the case of a genset with field coils, a current needs to flow in the field coils to generate the magnetic field. In other words, for a genset using field coils, a field current needs to be supplied during operations of the genset. The level of the field current determines the strength of the magnetic field. The exciter 132 is the power source that supplies the field current. The exciter 132 may receive field flash voltage from the battery 160 in the starting sequence and voltage from a circuit drawing voltage from the generator 130 in a running state. The exciter 132 may be a static-type exciter, a brush-type exciter, a brushless-type exciter, or any suitable type of exciter. The battery charger 134 is coupled to the battery 160 in order to charge the battery 160 by drawing power from the generator 130 in the running state.

The operator panel 140 may serve as a user interface of the genset 100. The operator panel 140 may be structured to convey information to a user on a display (not illustrated in the present Figures) and to receive a user input via, for example, a keypad, switches, and/or buttons. The operator panel 140 is communicably coupled with the controller 110 that is responsive to command signals generated through the operator panel 140.

Figure 2:
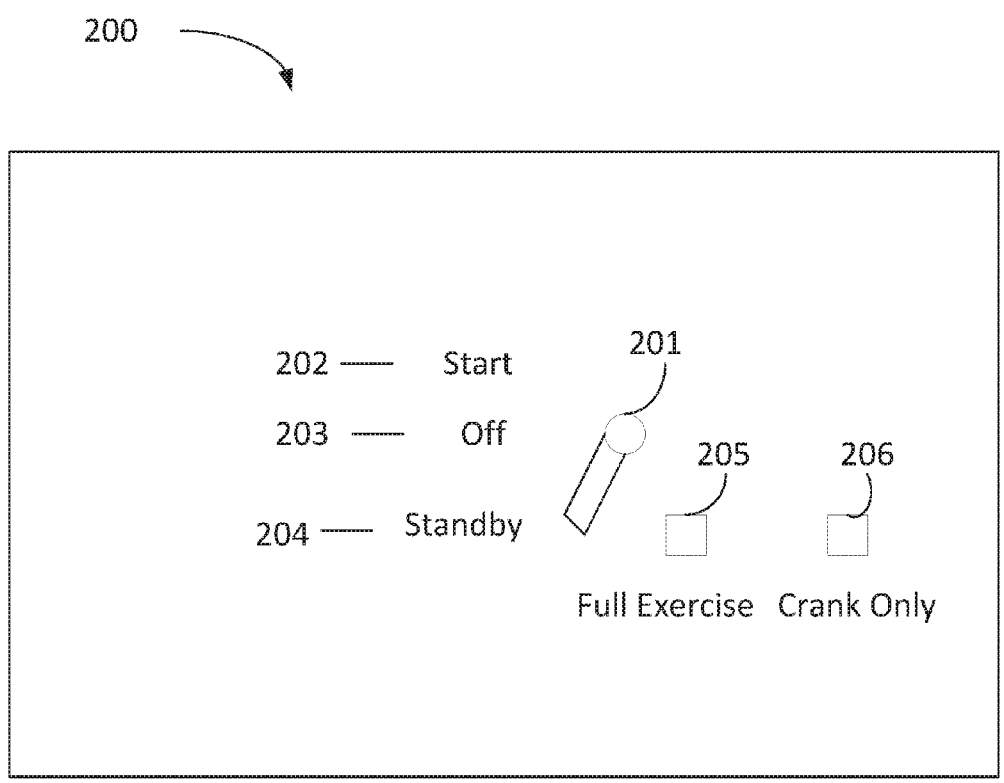
FIG. 2 is a schematic diagram of a portion of an operator panel of FIG. 1 in which a crank only mode is selected.

Referring to FIG. 2, a schematic diagram of a portion of the operator panel 200 is shown according to an exemplary embodiment. The operator panel 200 may be used on, for example, the genset 100 shown in FIG. 1. The operator panel 200 includes, among others, a three-position rocker switch 201 to operate the genset 100. In some implementations, the rocker switch 201 can be used to select one of three operating modes, namely, "Start," "Off," and "Standby." When the "Standby" mode is enable, one of the two buttons, "Full Exercise" button 205 and "Crank Only" button 206, can be pressed. The rocker switch 201 may also include a lamp indicating whether the genset 100 is running and/or providing genset fault codes. The Start mode may be selected by moving the rocker switch 201 to a top position 202. In the Enabled mode, the engine 120 is activated. The Off mode may be selected by moving the rocker switch 201 to a middle position 203. In the Off mode, the engine 120 is turned off. The Standby mode may be selected by moving the rocker switch 201 to a bottom position 204. Only in the Standby mode can the exercise function be enabled. The "Full Exercise" mode may be selected by pressing the "Full Exercise" button 205. In the Full Exercise mode, the engine 120 may go through a full exercise during every exercise cycle. In the full exercise, the fuel valve 122 and the ignition system 123 may be activated and fuel may be supplied to the engine 120 and ignited. The engine 120 is then started and run for a period of time (for example, from 20 minutes to a few hours) at its nominal operating speed with or without a load. The Crank Only mode may be selected by pressing the "Crank Only" button 206. In the Crank Only mode, the engine 120 may go through the crank only exercise during at least some of the exercise cycles. In the crank only exercise, fuel ignition does not happen (e.g., the fuel valve 122 of the genset 100 is turned off, and/or the ignition system 123 is disabled, and/or the throttle is closed, and/or the engine valve train is deactivated). The genset may go through a full crank cycle, but since fuel is not provided and/or fuel is not ignited, fuel ignition will not occur. In some implementations, the engine cranking may have a duration of between 1 to 60 seconds (e.g., 5 seconds). In some embodiments, in the Crank Only mode, the engine 120 may go through the full exercise during some other exercise cycles. It shall be appreciated that the configuration of the operator panel 200 shown in FIG. 2 is provided for purposes of illustration only. Other embodiments may include fewer, more, or different components than those illustrated in FIG. 2. For example, the operator panel 200 may display genset fault messages, time, battery state of charge, warning, mode, and other information to a user.

The controller 110 may perform functions to start, stop, and crank the genset 100 by controlling various components of the genset 100. The controller 110 is communicably coupled with the operator panel 140 and responsive to command signals (i.e., Start, Off, Standby, Full Exercise, and Crank Only) generated through the operator panel 140, and causes the operator panel 140 to display information such as fault messages and battery information. The controller 110 is communicably coupled to the starter 150. In the full exercise, the controller 110 actuates the starter 150 to accelerate the engine 120 during a start sequence and disable the starter 150 when the engine 120 reaches a nominal speed (e.g., 3600 revolutions per minute (RPM) for a 60 Hz AC genset) based on speed data acquired from the speed sensor 126. In some implementations, in the full exercise mode, the engine 120 may be gradually/slowly ramped up from a starting condition to a full power and/or full exercise speed. In the crank only exercise, the controller 110 actuates the starter 150 to accelerate the engine 120 to a speed lower than the nominal speed (e.g., 400 to 1000 RPM). The starter 150 is disengaged after a full crank cycle is completed (e.g., in 1 to 60 seconds). The controller 110 is communicably coupled with the engine 120 and selectively activates or deactivates the fuel valve 122 and/or the ignition system 123. In the full engine exercise, the controller 110 turns on the fuel valve 122 and enables the ignition system 123. As the starter 122 accelerates the engine 120, fuel is supplied to the engine 120 through the fuel valve 122 and ignited by the ignition system 123. Upon successful ignition of the engine 120 and once the engine 120 has reached a self-sustaining speed the starter 150 is disengaged. In the crank only exercise, the controller 110 deactivates the fuel valve 122 and/or the ignition system 123 and/or closes the throttle, and/or deactivates the engine valve train, so that ignition does not happen. The controller 110 is communicably coupled to the generator 130 and controls the field current supplied by the exciter 132 through a voltage regulator 116, which will be discussed in detail below with the description of the voltage regulator 116. The controller 110 is communicably coupled to the battery 160 and may acquire battery information such as state of charge.

The controller 110 includes a processor 112, a memory 114, and a voltage regulator 116. The voltage regulator 116 may regulate output voltage of the genset 100 by regulating the field current provided to the exciter 132 of the generator 130. As discussed above, the level of the field current determines the strength of the magnetic field, thereby determining the output voltage. In the full engine exercise, when the engine is started, the exciter 132 receives the field current from the battery 160 to create an initial voltage, which in turn increases the field current, until the generator 130 builds up to full voltage. After the start sequence, the output of the generator 130 is fed up to the voltage regulator 116 and serves as a source of the field current. In the crank only exercise, the exciter 132 receives the field current from the battery 160 for the full crank cycle. In some embodiments, the voltage regulator 116 may include a "feedforward" design. In other embodiments, the voltage regulator 116 may include negative feedback control loops, or any suitable design. The voltage regulator 116 may use electromechanical mechanism, electronic components, or any suitable components. The voltage regulator 116 is integrated into the controller 110 as shown in FIG. 1. In other embodiments, the voltage regulator 116 may be a separate component.

The processor 112 may be implemented as a general-purpose processor, an application specific integrated circuit (ASIC), one or more field programmable gate arrays (FPGAs), a digital signal processor (DSP), a group of processing components, or other suitable electronic processing components.

The memory 114 may be one or more memory devices (e.g., RAM, ROM, flash memory, hard disk storage, etc.) that stores data and/or computer code for facilitating the various processes described herein. Thus, the memory 114 may be communicably connected to the processor 112 and provide computer code or instructions to the processor 112 for executing the processes described in regard to the controller 110 herein. Moreover, the memory 114 may be or include tangible, non-transient volatile memory or non-volatile memory. Accordingly, the memory 114 may include database components, object code components, script components, or any other type of information structure for supporting the various activities and information structures described herein.

Although the controller 110 is implemented as the processor 112 and memory 114 in the embodiment shown in FIG. 1, in other embodiments, the controller 110 may be implemented as dedicated hardware such as circuitry.

Communication between the controller 110 and various components of the genset 100 may be via any number of wired or wireless connections. For example, a wired connection may include a serial cable, a fiber optic cable, a CAT5 cable, or any other form of wired connection. In comparison, a wireless connection may include the Internet, Wi-Fi, cellular, radio, etc. In one embodiment, a controller area network (CAN) bus provides the exchange of signals, information, and/or data. The CAN bus may include any number of wired and wireless connections.

It shall also be appreciated that the configuration of the generator 130 shown in FIG. 1 is provided for purposes of illustration only. Other embodiments may include fewer, more, or different components than those illustrated in FIG. 1.

Figure 3:
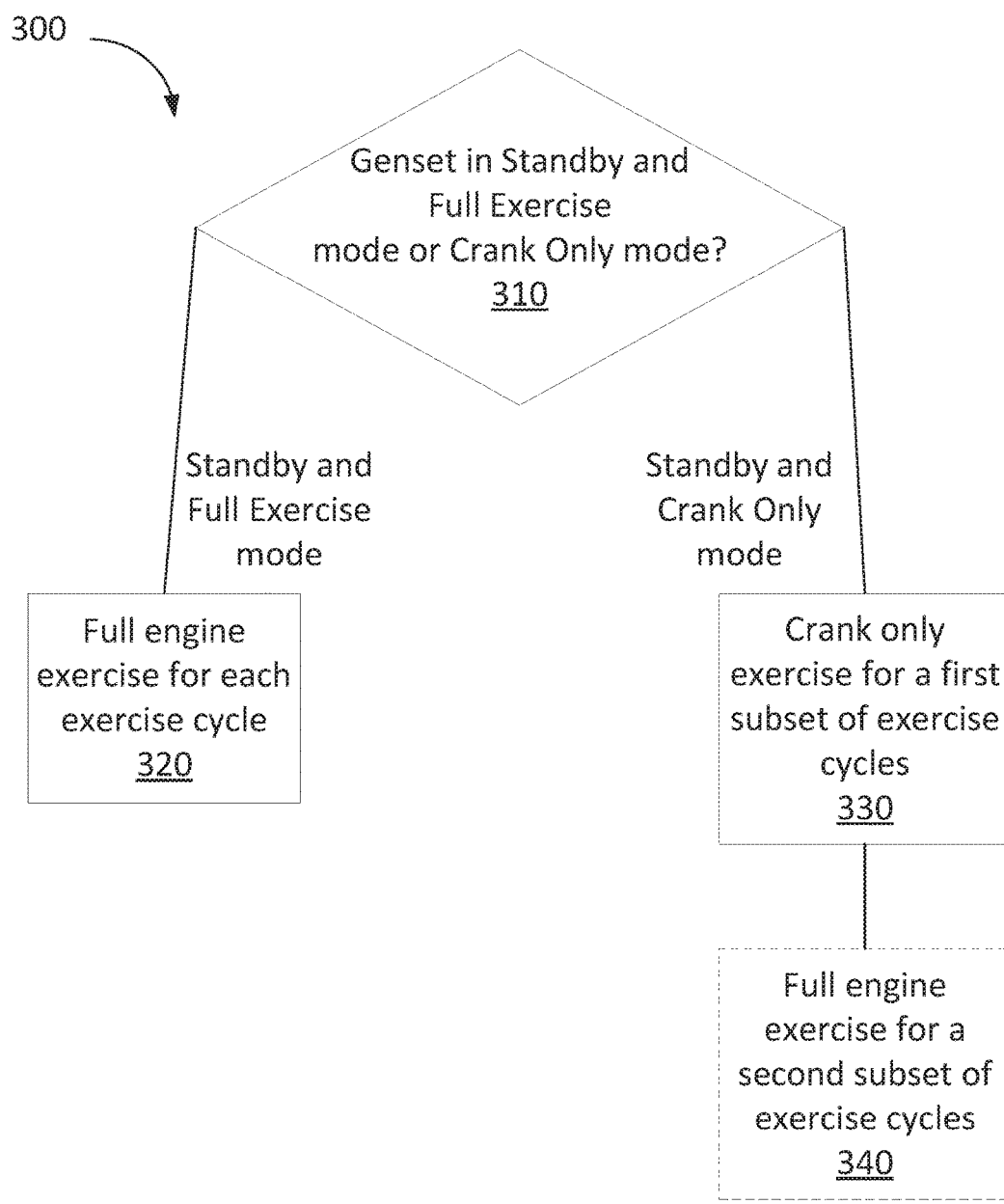
FIG. 3 is a flow chart for exercising a genset of FIG. 1.

Referring to FIG. 3, a flow chart 300 for exercising a genset is shown according to an exemplary embodiment. The flow chart may be implemented on the genset 100 and components shown in FIGS. 1 and 2.

At an operation 310, the controller 110 detects whether the genset 100 is in Standby mode, and, if so, whether the genset 100 is in the Full Exercise mode or the Crank Only mode. As discussed above, the Full Exercise mode and the Crank Only mode may be disabled if the genset 100 is not in the Standby mode. In some implementations, each of the Full Exercise mode and the Crank Only mode can be selected manually, such as by a user moving the rocker switch 201 on the control panel 200 to a top position 202 or a bottom position 204.

At an operation 320, in response to detecting the genset 100 is in the Standby mode and the Full Exercise mode, the controller 110 implements a full exercise on the engine 120 at every exercise cycle, i.e., ignites fuel to activate the genset 100. In some embodiments, activating the plurality of exercise cycles includes detecting whether a day and/or time maintained by the genset 100 (e.g., the controller 110) meets a predetermined day and/or time for any of the plurality of exercise cycles, and activating a particular exercise cycle in response to detecting that the day and/or time maintained by the genset meets the predetermined day and/or time for the particular exercise cycle. The day and/or time may be set by a user, such that the user determines the schedule at which exercise functions are set to occur.

In response to detecting the genset 100 is in the Standby mode and the Crank Only mode, the controller 110 implements a crank only exercise on the engine 120 during at least a first subset of exercise cycles, at an operation 330. In some implementations, for a crank only exercise, the controller 110 prevents fuel ignition from happening, but actuates the starter 150 to accelerate the engine 120 to a speed (e.g., 500 RPM) lower than the nominal speed (e.g., 3600 RPM). The starter 150 is disengaged after a full crank cycle is completed (e.g., in 1-60 seconds). Optionally, in response to detecting the genset 100 is in the Crank Only mode, the controller 110 implements a full exercise on the engine 120 during a second subset of exercise cycles, at an operation 340. In some implementations, for the Crank Only mode, the full engine exercise and the crank only exercise may be scheduled on a regular basis such as weekly, biweekly, monthly, etc. In some embodiments, the genset 100 is arranged to alternate between the full exercise and the crank only exercise periodically, such as at every other scheduled exercise event, every third event, etc.

Automated testing and/or examination may be done on various components of the genset 100 manually or automatically if any faults occur during the crank only exercise. The controller 110 can diagnose and alert the user to also check whether the starter 150 motor works properly and whether the starter 150 circuit connections are loose or corroded. The user may remove the starter 150 and check for broken teeth on the flywheel or broken starting motor springs. The controller 110 can diagnose and alert the user to also check whether the speed sensor 126 works properly. The user can further check whether the battery 160 charge is low. If there is no AC output voltage from the generator 130 or the voltage is lower than desired, the controller 110 can diagnose and alert the user to check whether the exciter 132 circuit works properly, whether the battery 160 charge is low, and whether the voltage regulator 116 circuit works properly.

In some embodiments, additional diagnostics may be run automatically on the battery 110, the alternator 120, the speed sensor 126, the starter 150, the exciter 130, the voltage regulator 116, an oil lube system and a temperature sensor (not illustrated in the present FIGS.). For example, the state of charge (SoC) and/or state of health (SoH) of the battery 160 may be checked. If the SoC or SoH is abnormal (e.g., out of a predetermined range), a corresponding fault code/information preassigned to this type of fault may be displayed on the operator panel 140, providing a notification of the fault detected. The exciter 132 circuit and the voltage regulator 116 circuit may be checked by monitoring the AC output voltage from the generator 130. If there is no AC output voltage or the voltage is lower than desired, a corresponding fault code/information may be displayed on the operator panel 140.

As discussed above, the controller 110 may notify the user of the detected fault by displaying the corresponding fault code(s) on the operator panel 140. In some implementations, the fault information may be provided by other means, such as by turning on warning lamps associated with various types of faults on the genset 100 or generating sounds associated with various types of faults or through a remote monitoring system. In some embodiments, a notification may only be triggered if the fault appears in multiple crank cycles. In other words, in response to detecting the fault, the controller 110 may implement the crank only exercise on the engine 120 again. The controller 110 may reactivate the diagnostic processes and determine whether the fault is reoccurring. If the fault has reoccurred, the controller 110 may provide a notification of the fault. If the fault has not reoccurred, the controller 110 may notify the user a successful exercise event or "diagnostic test pass" via the operator panel 140 or a remote monitoring system.

In some embodiments, spinning of the genset 100 in the Crank Only mode may be assisted by a secondary or external power source. For example, an AC power source may be fed into the stator of the genset 100 and used to boost spinning of the genset 100 during the crank only cycle. In some implementations, the external or secondary power may be provided by a battery or other energy storage device coupled to the genset 100, a utility source coupled to the genset 100, or another type of power source.

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

While this specification contains specific implementation details, these should not be construed as limitations on the scope of any inventions or of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations may be depicted in a particular order, this should not be understood as requiring that such operations be performed in the particular order shown or in sequential order, or that all operations be performed, to achieve desirable results. Moreover, the separation of various aspects of the implementation described above should not be understood that the described methods can generally be integrated in a single application or integrated across multiple applications.

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A method for exercising a genset, comprising:
   detecting whether the genset is in a first mode or a second mode; and
   activating a plurality of exercise cycles of the genset, wherein activating the plurality of exercise cycles comprises:
      in response to detecting the genset is in the first mode, igniting fuel to activate the genset during each of the plurality of exercise cycles of the genset; and
      in response to detecting the genset is in the second mode, cranking the genset without igniting fuel during at least a first subset of the plurality of exercise cycles.

2. The method of claim 1, wherein activating the plurality of exercise cycles further comprises, in response to detecting the genset is in the second mode, igniting fuel to activate the genset during a second subset of the plurality of exercise cycles.

3. The method of claim 1, wherein each of the first mode and the second mode is selected via an operator panel of the genset.

4. The method of claim 2, further comprising scheduling the first subset and the second subset of the plurality of exercise cycles to activate periodically in response to detecting the genset is in the second mode.

5. The method of claim 2, further comprising alternating between the first subset and the second subset of the plurality of exercise cycles during every other exercise cycle in response to detecting the genset in the second mode.

6. The method of claim 1, wherein activating the plurality of exercise cycles further comprises:
   detecting whether a time maintained by the genset meets a predetermined time for any of the plurality of exercise cycles; and
   activating a particular exercise cycle in response to detecting that the time maintained by the genset meets the predetermined time for the particular exercise cycle.

7. The method of claim 1, wherein the cranking the genset comprises:
   actuating a starter of the genset to accelerate the engine to a speed lower than a nominal speed of the genset; and
   actuating an exciter of the genset to provide a field current to a generator of the genset.

8. The method of claim 1, wherein cranking the genset without igniting fuel comprises cranking the genset for a duration of between 1 to 60 seconds.

9. The method of claim 1, wherein cranking the genset without igniting fuel comprises at least one of deactivating a fuel valve, deactivating an ignition system, closing a throttle, or deactivating an engine valve train.

10. The method of claim 1, further comprising:
    activating one or more diagnostic processes on at least one of a starter, a battery, an alternator, an oil lube system, a temperature sensor, a speed sensor, an exciter, or a voltage regulator of the genset while cranking the genset without igniting fuel; and
    obtaining diagnostic data while the diagnostic processes are active.

11. The method of claim 10, further comprising:
    detecting a fault in the diagnostic data; and
    providing a notification of the fault.

12. The method of claim 10, further comprising:
    detecting a fault in the diagnostic data;
    in response to detecting the fault, cranking the genset again, reactivating the diagnostic processes, and determining whether the fault is reoccurring; and
    in response to detecting reoccurrence of the fault, providing a notification of the fault.

13. The method of claim 10, further comprising:
    providing a notification of a successful exercise event in response to not detecting any fault in the diagnostic data.

14. A system, comprising:
    circuitry configured to:
       detect whether a genset is in a first mode or a second mode;
       in response to detecting the genset is in the first mode, ignite fuel to activate the genset during each of a plurality of exercise cycles of the genset; and
       in response to detecting the genset is in the second mode, crank the genset without igniting fuel during at least a first subset of the plurality of exercise cycles.

15. The system of claim 14, wherein the circuitry is further configured to: in response to detecting the genset is in the second mode, ignite fuel to activate the genset during a second subset of the plurality of exercise cycles.

16. The system of claim 15, wherein the circuitry is further configured to alternate between the first subset and the second subset of the plurality of exercise cycles during every other exercise cycle.

17. The system of claim 14, wherein the cranking the genset comprises:
    actuating a starter of the genset to accelerate the engine to a speed lower than a nominal speed of the genset; and
    actuating an exciter of the genset to provide a field current to a generator of the genset.

18. The system of claim 14, wherein the circuitry is further configured to:
    activate one or more diagnostic processes on at least one of a starter, a battery, an alternator, an oil lube system, a temperature sensor, a speed sensor, an exciter, or a voltage regulator of the genset while cranking the genset without igniting fuel; and
    obtain diagnostic data while the diagnostic processes are active.

19. The system of claim 18, wherein the circuitry is further configured to:
  detect a fault in the diagnostic data; and
  provide a notification of the fault.

20. The system of claim 18, wherein the circuitry is further configured to:
  detect a fault in the diagnostic data;
  in response to detecting the fault, crank the genset again, reactivate the diagnostic processes, and determine whether the fault is reoccurring; and
  in response to detecting reoccurrence of the fault, provide a notification of the fault.

21. The system of claim 18, wherein the circuitry is further configured to provide a notification of a successful exercise event in response to not detecting any fault in the diagnostic data.

22. A genset comprising:
  an engine including a fuel valve and an ignition system;
  a starter connected to the engine;
  an alternator connected to the engine;
  an exciter electrically connected to the alternator; and
  a controller configured to:
    detect whether the genset is in a first mode or a second mode;
    in response to detecting the genset is in the first mode, ignite fuel to activate the genset during each of a plurality of exercise cycles of the genset;
    in response to detecting the genset is in the second mode:
      ignite fuel to activate the genset during a first subset of the plurality of exercise cycles; and
      crank the genset without igniting fuel during a second subset of the plurality of exercise cycles, wherein cranking the engine comprises:
        actuating the starter to accelerate the engine to a predetermined speed lower than a nominal speed of the genset; and
        actuating the exciter to provide a field current to the generator; and
      activate one or more diagnostic processes on at least one of the starter, a battery, the alternator, an oil lube system, a temperature sensor, a speed sensor, the exciter, or a voltage regulator of the genset while cranking the genset without igniting fuel in the second mode;
      obtain diagnostic data while the diagnostic processes are active;
      detect a fault in the diagnostic data; and
      provide a notification of the fault.

23. The genset of claim 22, further comprising an operator panel communicably connected with the controller, wherein the first mode and the second mode are selectable via the operator panel, and wherein the notification of the fault is displayed on the operator panel.

24. The genset of claim 22, wherein the controller is further configured to alternate between the first subset and the second subset of the plurality of exercise cycles during every other exercise cycle in response to detecting the genset is in the second mode.

25. The genset of claim 22, wherein cranking the genset without igniting fuel comprises cranking the genset for a duration of between 1 to 60 seconds.

26. The genset of claim 22, wherein the controller is further configured to:
  in response to detecting the fault, crank the genset again, reactivate the diagnostic processes, and determine whether the fault is reoccurring; and
  in response to detecting reoccurrence of the fault, notify a user of the fault is reoccurring.

27. The genset of claim 22, wherein the controller is further configured to provide a notification of a successful exercise event in response to not detecting any fault in the diagnostic data.

* * * * *